March 17, 1964  F. HENNIG  3,125,011
AUTOMATIC OR MANUALLY OPERABLE CAMERA
Filed Aug. 28, 1961  5 Sheets-Sheet 1

INVENTOR.
FRIDOLIN HENNIG
BY Michael S. Striker
Attorney

March 17, 1964   F. HENNIG   3,125,011
AUTOMATIC OR MANUALLY OPERABLE CAMERA
Filed Aug. 28, 1961   5 Sheets-Sheet 3

Fig.4

INVENTOR.
FRIDOLIN HENNIG

March 17, 1964 F. HENNIG 3,125,011
AUTOMATIC OR MANUALLY OPERABLE CAMERA
Filed Aug. 28, 1961 5 Sheets-Sheet 5

Fig.6

INVENTOR.
FRIDOLIN HENNIG
BY Michael S. Striker

United States Patent Office 3,125,011
Patented Mar. 17, 1964

3,125,011
AUTOMATIC OR MANUALLY OPERABLE
CAMERA
Fridolin Hennig, Munich, Germany, assignor to Agfa Aktiengesellschaft in Leverkusen-Bayerwerk, Munich, Germany
Filed Aug. 28, 1961, Ser. No. 134,422
Claims priority, application Germany Sept. 7, 1960
12 Claims. (Cl. 95—10)

The present invention relates to cameras.

More particularly, the present invention relates to that type of camera which is capable of being operated not only in a fully automatic manner but also manually so that the operator can, if he so desires, manually set the exposure aperture and exposure time of the camera.

Cameras of this type conventionally include a light meter assembly, and the pointer of the meter is conventionally scanned by the structure which automatically operates the camera so that in this way the automatic structure is controlled in accordance with the lighting conditions to set the camera so as to make a proper exposure. Of course, when operating the camera manually it is also highly desirable to be able to use the light meter assembly so as to give to the operator a guide enabling him to properly set the camera, and in conventional cameras of this type there is a conflict between the automatic and manual structure since it is of course undesirable to scan the position of the pointer during manual operation of the camera but at the same time it is highly desirable to be able to use the position of the pointer of the light meter to indicate to the operator when he has properly set the camera with the chosen combination of exposure time and exposure aperture.

It is accordingly a primary object of the present invention to provide a camera of the above type which can be operated on the one hand in a fully automatic manner and on the other hand manually, and which when it is operated manually will provide no conflict between the scanning structure and the light meter structure while at the same time permitting the operator to make full use of the light meter structure so as to indicate to the operator when he has properly set the camera during manual operation thereof.

It is also an object of the present invention to provide a structure which will, in a fully automatic manner, position a scanning structure and light meter structure with respect to each other in such a way that they will cooperate together during automatic operation of the camera and will not cooperate with each other during manual operation of the camera, while at the same time permitting the light meter to be used by the operator during manual operation of the camera.

It is another object of the present invention to provide a structure which will automatically render the structure which is used to set the camera according to the position of the light meter pointer during manual operation invisible to the operator during automatic operation of the camera.

It is furthermore an object of the present invention to provide a structure which will automatically position both a scanning element, during automatic operation of the camera, and an indicating element, during manual operation of the camera, according to the combination of the settings of the exposure time and exposure aperture of the camera, so that during automatic or manual operation of the camera it becomes possible to use the position of the pointer of the light meter to set the camera.

An additional object of the present invention is to provide a relatively simple rugged structure which is very reliable in operation and which will accomplish all of the above objects.

With the above objects in view, the invention includes, in a camera which is capable of being operated either automatically or manually, a pair of means one of which is a combined scanning and indicating means and the other of which is a meter means adapted to be actuated by a photosensitive element responding to the lighting conditions and having a pointer which it moves to positions indicative of the lighting conditions. A support means supports one of these means for movement toward and away from the other of these means. A positioning means cooperates with that one of the pair of means which is movably supported by the support means for moving the movable means to a position where the pointer of the meter means and a scanning portion of the combined scanning and indicating means will cooperate with each other, during automatic operation of the camera, and to a position where this scanning portion of the combined scanning and indicating means is located beyond the range of movement of the pointer of the meter means, during manual operation of the camera. During this manual operation of the camera, however, an indicating portion of the combined scanning and indicating means cooperates with the pointer of the meter means so that the operator may use this indicating portion of the combined scanning and indicating means to determine when the camera has been properly set during manual operation. A moving means is provided for moving the combined scanning and indicating means according to the settings of the exposure time and exposure aperture of the camera, and this moving means operates both during automatic and manual operation of the camera, and the positioning means which positions the movable one of the pair of means referred to above is operated in a fully automatic manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
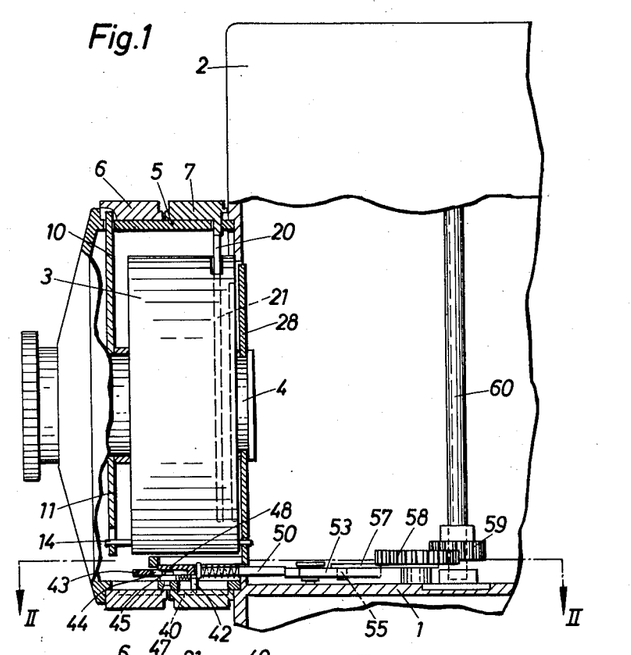
FIG. 1 is a fragmentary partly sectional longitudinal elevation taken in a plane parallel to the optical axis of a camera according to the present invention.
Figure 4:
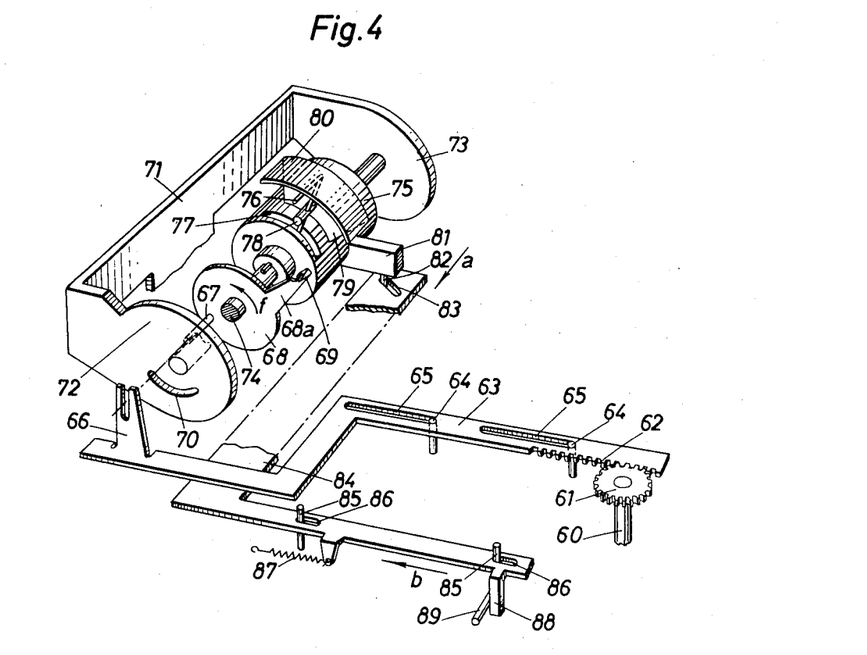
FIG. 4 is a perspective exploded view of the meter means, combined scanning and indicating means, and the structure which operates both of these means according to the present invention.

Referring to FIG. 1, there is shown therein the camera housing 1 and the hollow upper compartment 2 carried by the camera housing 1, this hollow compartment 2 serving to house such elements as a viewfinder, range finder, and additional structure which is shown in FIG. 4 and described below. The camera housing 1 carries an objective assembly which includes the shutter 3 which is of a conventional construction, and the tube 4 which is surrounded by the shutter assembly 3 carries the lenses of the objective in a well known way. The tube 4 and the entire shutter assembly 3 are surrounded by an outer tube 5. These components 3—5 are fixedly carried by the housing 1.

Figure 3:
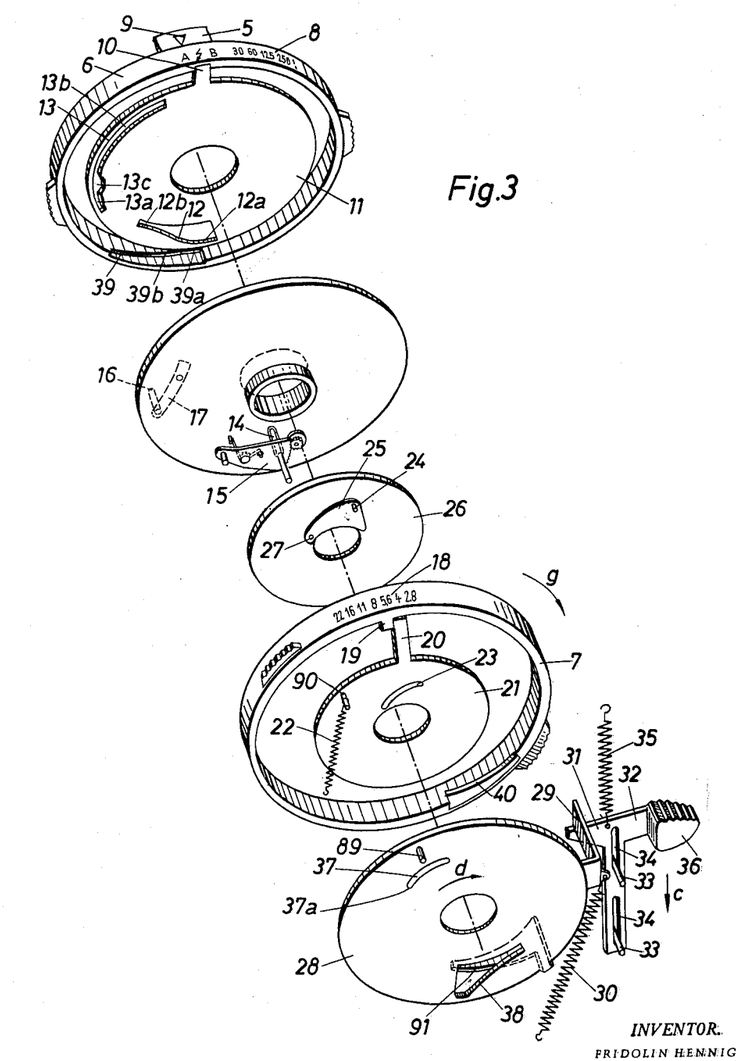
FIG. 3 is an exploded perspective view of the objective assembly of FIGS. 1 and 2.

A manually operable means for setting the exposure time takes the form of a ring 6 which is turnably carried by the outer tube 5 at its exterior, and the diaphragm or exposure aperture of the camera is set by manual turning of the diaphragm-setting ring 7 which is also located at the exterior of and supported for rotary movement by the tube 5. Thus, the elements 6 and 7 form a manually operable means for manually setting the exposure time and exposure aperture of the camera. As may be seen from FIG. 3, the exposure time setting ring 6 carries at its exterior a scale 8 of exposure times, and this scale includes the symbol A for determining the position of the ring 6 during automatic operation, a symbol of a flash of lightning, to indicate the position for operation of the camera with flash illumination, and the symbol B which indicates the position at which the operator may manually maintain the shutter open for as long as the operator desires. All of these graduations of the scale 8 cooperate with a stationary index 9 carried by the stationary outer tube 5, so as to indicate to the operator the position to which the ring 6 should be turned. The ring 6 is formed at its interior with a notch which receives the free end of a lug 10 (FIG. 3) which projects radially from the outer periphery of and forms part of the ring 11 which sets the exposure time. Thus, the ring 11 forms an exposure time setting means actuated by the manually operable means 6. This ring 11, which is supported by the tube 4 for rotary movement about the optical axis, as shown in FIG. 1, is formed, as indicated in FIG. 3, with a cutout having a camming edge 12 whose curvature is designed to control the exposure time. In addition, the ring 11 is formed with an elongated substantially arcuate cutout 13 which also participates in the control of the exposure time in a manner described below. The camming edge 12 has a pair of portions 12a and 12b, and the camming edge 12 is engaged by the control pin 14 of the structure for introducing into the shutter driving assembly a predetermined retarding force, so as to provide the desired exposure time. Thus, the pin 14 is connected to a pivotally supported sector 15 located in the housing 3 and this sector 15 will in a known way set a retarding mechanism which will retard the structure which drives the shutter to a predetermined degree according to the angular position of the sector 15. Of course, the angular position of the sector 15 will be determined by the cooperation of the camming edge 12 with the pin 14. The elongated arcuate slot 13 has a pair of elongated portions 13a and 13b, and between these portions the slot 13 has a somewhat wider portion 13c. The width of the portions 13a and 13b corresponds approximately to the cross-section of the pin 16 which is carried by a lever 17 which in a known way enables the operator, when the symbol B is aligned with the index 9, to manually maintain the shutter blades in their open position for a period of time determined by the operator himself.

The rotary aperture-setting ring 7 carries at its exterior a scale 18 of f-stop numbers, and this scale cooperates with an unillustrated stationary index, so the operator knows at which angular positions to place the ring 7 in order to provide a desired exposure aperture. The ring 7 fixedly carries at its interior a radial projection 19 extending toward the optical axis, and a radial projection 20 of a diaphragm-setting ring 21 engages the projection 19 in the manner shown in FIG. 3. The ring 21 forms an exposure aperture setting means which is capable of being actuated by the manually operable means 7. A spring 22 cooperates with the ring 21 to urge it to turn in a counterclockwise direction, as viewed in FIG. 3, so as to urge the projection 20 into engagement with the projection 19. The diaphragm-setting ring 21 is formed with a plurality of curved control slots 23 which respectively receive the pins 24 which are respectively carried by the diaphragm blades 25 which are in turn respectively supported for turning movement by a plurality of stationary pivot pins 27, respectively, these pivot pins being carried by a stationary ring 26 which surrounds the optical axis. For the sake of clarity, only one diaphragm blade 25 with its pivot pin 27 and its actuating pin 24 is shown, and also only one of the control slots 23 is shown. Thus, when the ring 21 turns with respect to the stationary ring 26 the diaphragm blades 25 will move toward or away from the optical axis so as to set the exposure aperture.

The tube 4 also supports for rotary movement part of the automatic means for automatically setting the camera, and this automatic means includes a drive member in the form of a ring 28 which is supported for rotary movement by the tube 4 at its rear end, as shown in FIG. 1. As may be seen most clearly from FIG. 3, the drive ring 28 of the automatic means fixedly carries an arm 29 which extends forwardly and which engages, under the influence of a spring 30, the upper portion 31 of a manually releasable means 32 for manually releasing the automatic means for operation. The spring 30 is under tension in the position of the parts shown in FIG. 3 and serves to drive the driving ring 28 in the direction of the arrow d. The release member 32 is guided for vertical movement by the stationary pin 33 which extends through the vertical slot 34 formed in the release member 32, and a return spring 35, which is stronger than the spring 30, yieldably maintains the release member 32 in its rest position, the upward movement of the member 32 being limited by engagement of the bottom ends of the slots 34 with the pins 33, respectively. At the exterior of the camera, the release member 32 fixedly carries a manually engageable member 36 which can be pressed upon by the operator for the purpose of moving the release member 32 downwardly in the direction of the arrow c of FIG. 3 in opposition to the spring 35 for releasing the automatic means to the spring 30. The driving ring 28 is formed with an arcuate slot 37 the length of which corresponds to the entire range through which the diaphragm setting ring 21 is turned. This slot 37 receives a pin 90 which is fixed to the diaphragm setting ring 21, and this pin 90 also serves the additional function of providing an element to which one end of the spring 22 can be connected, as indicated in FIG. 3, the opposite end of this spring 22 being connected to a stationary element of the camera, and in the same way the lower end of the spring 30 which is shown in FIG. 3 is connected to a stationary element of the camera, while the upper end of the spring 30 is connected to the ring 28 so as to urge the latter to turn in the direction of the arrow d. In the embodiment of FIGS. 1–4, the driving ring 28 is formed with a cutout the edge 38 of which forms an exposure time controlling cam, and the pin 14 extends rearwardly beneath the elements such as the rings 26 and 21 into the cutout shown in FIG. 3 at the lower part of the drive ring 28, so that the rear end portion of the pin 14 engages the camming edge 38. Thus, with this embodiment of the invention the ring 28 not only forms the drive member which drives the automatic structure, but in addition it takes over the function of the ring 11 and serves to set the exposure time during automatic operation of the camera.

Figure 2:
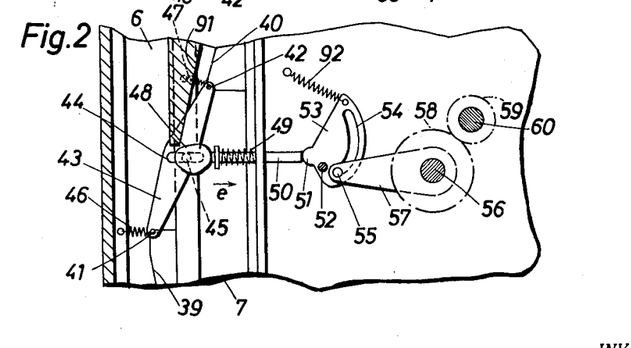
FIG. 2 is a sectional plan view taken along line II—II of FIG. 1 in the direction of the arrows.

As is shown clearly in FIG. 3, the lower inner surface of the exposure time setting ring 6 is formed with a recess providing a camming edge 39, while the lower inner part of the aperture setting ring 7 is formed with a recess providing an inclined camming edge 40. These cams 39 and 40 cooperate with a differential means for actuating a moving means described below according to the combined settings of the exposure time and exposure aperture of the camera. In the embodiment of FIGS. 1–4 this differential means takes the form of a two-armed lever 43 carrying at its ends pins 41 and 42 which respectively engage the camming edges 39 and 40, as shown in FIGS. 1 and 2. This lever 43 of the differential means is formed at its central portion with an elongated slot 44 which receives a stationary, upwardly directed pin 45 carried by the tube 5 at its interior, so that in this way the lever 43 not only can turn about the pin 45 but also can shift in a direction parallel to the optical axis with respect to the pin 45. A pair of springs 46 and 47 are respectively connected to the ends of the lever 43 and to stationary parts of the camera so as to urge the pins 41 and 42 into engagement with the cams 39 and 40. This lever 43 also fixedly carries a motion-transmitting element 48. This element 48 on the one hand acts as a cam follower and cooperates with the camming edge 91 of a cam which is carried by the ring 28 for rotary movement therewith. Thus, this cam which has the camming edge 91 forms a part of a cylinder whose axis coincides with the optical axis and whose diameter equals the outer diameter of the ring 28, and this cam is fixedly connected to the plate 28 for rotary movement therewith, and it will be noted that the camming edge 91 is inclined and is directed toward the rear of the camera so as to cooperate with the front end of the motion-transmitting element 48. Thus, during turning of the ring 28 by the spring 30 the camming edge 91 will cooperate with the element 48 to move this latter element toward the rear, and in this way the entire lever 43 will be shifted to the rear, the slot 44 enabling the lever 43 to shift in this manner with respect to the stationary pin 45. The element 48 transmits movement to an elongated rod 50 which is supported in an opening of a stationary wall of the camera for free movement longitudinally in a direction parallel to the optical axis, and the front end of this rod 50 is maintained in engagement with the rear end of the element 48 by a spring 49 which is coiled about the element 50 between the wall through which the element 50 extends and a collar fixed to the rod 50 adjacent its front end, as shown most clearly in FIG. 2. Thus, it will be seen that whether the position of the lever 43 is determined by the cams 39 and 40 during manual operation of the camera, or whether the position of the lever 43 is determined by the camming edge 91 during automatic operation of the camera, the motion transmitting element 48 will cooperate with the rod 50 to place this rod 50 in an axial position which will be indicative of the combined setting of the exposure time and exposure aperture of the camera. It should be noted that the edge of the element 48 which engages the front end of the rod 50 is a cam which during turning of the lever 43 by the cooperation of the camming edges 39 and 40 with the pins 41 and 42, respectively, will cause the rod 50 to shift longitudinally to positions indicative of the settings which are introduced into the camera.

The end of the rod 50 distant from element 48 bears against a projection 51 of a lever 53 which is supported for rotary movement by a stationary pivot pin 52 carried by the camera housing 1, and a spring 92 is connected to the camera housing 1 and to the lever 53 to urge this lever 53 to turn in a counterclockwise direction, as viewed in FIG. 2. The lever 53 is formed with an arcuate camming slot 54 whose curvature provides a compensation for the movement of the rod 50. As the rod 50 moves it turns the lever 53, and this turning is transmitted through the camming slot 54 to a pin 55 which is carried by a lever 57 supported for rotary movement about a stationary pivot 56 carried by the camera housing 1. The lever 57 is fixed to a gear 58 which turns about the pivot pin 56 with the lever 57, and this gear 58 meshes with a gear 59 which is fixed to an elongated vertically extending rod 60 supported for rotary movement in suitable stationary bearings of the camera. As may be seen from FIG. 4, the upper end of the rod 60 fixedly carries a pinion 61 which meshes with a rack 62 which forms part of an elongated motion transmitting element 63 which is formed with elongated slots 65 which receive the stationary pins 64, so that these pins 64 and the slots 65 guide the member 63 for movement along a straight line in response to turning of the rod 60. The elongated motion transmitting member 63 is provided at its end distant from the pinion 61 with a bifurcated projection 66 which receives a pin 67 which is fixed to the combined scanning and indicating means 68 which is in the form of a lever supported for free rotary movement by a shaft 74. Thus, the combined scanning and indicating means 68 can be turned freely with respect to the shaft 74. However, suitable collars or the like are provided so as to prevent axial movement of the combined scanning and indicating means 68 with respect to the shaft 74 which forms a support means supporting the combined scanning and indicating means 68 for rotary movement. This combined scanning and indicating means 68 has a radially projecting arm 68a which forms the scanning portion of the combined scanning and indicating means, and the outer end of the arm 68a is bent and pointed, as shown in FIG. 4, so as to form an indicating portion 69 of the combined scanning and indicating means 68. A bracket 71 is fixedly carried by the camera within its upper compartment 2 and has ears 72 and 73 which support the shaft 74. The ear 72 is formed with an arcuate slot 70 whose center of curvature is in the axis of the shaft 74, and the pin 67 which is fixed to the combined scanning and indicating means 68 extends freely through the slot 70 to be received in the portion 66 of member 63. Thus, the entire train of elements from the lever 43 through the rod 50, the lever 53, the lever 57, the gears 58 and 59, the rod 60, the gear and rack 61 and 62, and the motion-transmitting element 63 as well as the pin 67 forms a moving means capable of moving the combined scanning and indicating means 68 according to the combination of exposure time and exposure aperture set into the camera either manually or automatically. The shaft 74 is fixedly carried by the ears 72 and 73 of the bracket 71 and it also forms a support means for a meter means 75 which is adapted to be actuated in a well known manner by a photosensitive element which senses the lighting conditions, and the meter means 75 includes a pointer 76 forming a pointer means which is moved by the meter means 75, the pointer 76 extending freely through the slot 77 of the outer housing of the meter means 75. This meter means 75 is connected to the rod or shaft 74 for axial movement therealong but is incapable of turning with respect to the rod 74. For example, a key and keyway connection may be provided between the meter means 75 and the shaft 74 so that the latter in this way supports the meter means 75 for movement toward and away from the combined scanning and indicating means 68. In order to introduce the factor of the speed of the film which is used in the camera, the electrical circuit in which the meter 75 is connected may include, for example, a potentiometer capable of being adjusted in accordance with the particular film speed, or this factor may be taken care of in any other suitable way.

It will be noted that the pointer or pointer means 76 extends radially with respect to the meter 75 through the slot 77 and at its outer end has an elongated portion extending axially parallel to the shaft 74, and it is the outer free end of this axially extending portion of the pointer 76 which is visible to the operator through a suitable window of the outer wall of the upper compartment 2 of the camera. The radial portion of the pointer 76 fixedly carries a relatively short rod member 78 which extends parallel to the shaft 74. This rod member 78 is of a cylindrical configuration and at one end is located adjacent a wall 79 which has a portion fixed to and extending from the outer housing of the meter 75. At its outer periphery which is distant from the meter 75 the wall 79 is fixed with an arcuate cover member 80 which forms part of a cylinder coaxial with the shaft 74, and this cover 80 covers all except the outer tip of the pointer 76. The rod member 78 is covered by the cover member 80. The indicating portion 69 of the combined scanning and indicating means 68 is visible through the same window as the tip of the pointer 76, and also the cover 80 is at least partly visible in this window. The axially extending free end portion of the pointer 76 is located at a greater radial distance from the shaft 74 than the outer periphery of the ear 72, but the rod member 78 is closer to the shaft 74 than the outer periphery of the ear 72. In the position of the parts shown in FIG. 4, both the indicating portion 69 and the tip of the pointer 76 are visible, and this is the position which the parts take during manual operation of the camera. In a manner described below, during automatic operation of the camera the meter means 75 is shifted along the shaft 74 toward the combined scanning and indicating means 68 in the direction of the arrow $a$ of FIG. 4, and in this position of the parts, which they assume during automatic operation of the camera, the cover 80 covers the indicating portion 69 and renders it invisible to the operator, so that during automatic operation of the camera the operator cannot see the indicating portion 69 of the combined scanning and indicating means 68.

A positioning means is provided for positioning the meter means 75 either in the manually operating position indicated in FIG. 4 or in the other position for automatic operation, and this positioning means includes a projection 81 fixed to and extending from the meter 75 and carrying a pin 82 which extends into an inclined slot 83 which is formed in a shifting member 84. A pair of slots 86 are formed in the shifting member 84 and receives stationary pins 85. In this way the shifting member 84 is guided for movement in a direction perpendicular to the shaft 74 along a straight line, and it is apparent that this movement of the shifting member 84 is transmitted through the pin-and-slot connection 82, 83 to the meter means 75 for shifting the latter along the support means 74 between its two positions. A spring 87 is connected at one end to a stationary part of the camera and at its opposite end to the shifting member 84 so as to urge this member in the direction of the arrow $b$ shown in FIG. 4. At its end distant from the projection 81, the shifting member 84 has a downwardly directed projection 88 engaging a pin 89 which, as is indicated in FIG. 3, is fixedly carried by the driving ring 28 of the automatic means. Of course, the spring 35 is stronger than the total forces of the springs 30 and 87. In the position of the parts shown in the drawing, the spring 35 holds the shifting member 84 in the position illustrated in FIG. 4 in opposition to the spring 87 which is fully tensioned in the position of the parts shown in FIG. 4. Thus, the shifting member 84 by its cooperation with the driving member 28 and through the pin-and-slot connection 82, 83 forms a positioning means for positioning the meter means 75 in either of its two positions.

Assuming that with the parts in the position indicated in FIGS. 1–4, where the diaphragm ring 7 is set to provide the largest exposure aperture and where the ring 6 has been positioned to align the symbol A with the index 9, where the longest exposure time is provided, it is desired to operate the camera automatically so as to make an exposure, then the operator need only depress the manually-engageable element 36 in the direction of the arrow $c$ of FIG. 3, and this will of course lower the release member 32 so that the projection 29 can follow and the spring 30 will now turn the ring 28 in the direction of the arrow $d$. At the beginning of the turning of the driving ring 28, the pin 89 moves initially in the direction of the arrow $d$ so that the projection 88 of the shifting member 84 can follow the pin 89 while the spring 87 moves the shifting member 84 in the direction of the arrow $b$, and thus the inclined slot 83 moves with respect to the pin 82 so as to shift this pin 82 and the entire meter means 75 in the direction of the arrow $a$ to the position of the meter means required during automatic operation of the camera. The move- ment of the meter means 75 by the positioning means toward the ear 72 places the free end of the rod member 78 in engagement with the ear 72, and due to the elasticity of the pointer 76 the pointer 76 is deflected slightly so that the end of the member 78 distant from the ear 72 engages the wall 79, and in this way the rod member 78 is clamped between the ear 72 and the wall 79 so as to arrest the pointer 76 in the position it took just prior to the depression of the release means 32 by the operator. Moreover, this shifting of the meter means 75 to the automatic operating position has resulted in locating the rod portion 78 of the pointer means 76 in the path of movement of the scanning portion 68a of the combined scanning and indicating means 68. In the manual operating position shown in FIG. 4 the elements 76 and 78 are located beyond the combined scanning and indicating means 68 so that there can be no conflict between these elements. However, upon moving to the automatic operation position the rod member 78 becomes located in the path of movement of the scanning portion 68a.

The continued turning of the driving member 28 of the automatic means causes the camming edge 38 to shift the pin 14 so as to set the exposure time, and simultaneously the end 37a of the slot 37 engages the pin 90 so as to turn the diaphragm-setting ring 21 in opposition to the spring 22 in the direction of the arrow $g$ shown in FIG. 3, so that the size of the exposure aperture is reduced simultaneously with the reduction in the exposure time, and all of these operations take place simultaneously. The reduction in the exposure time and the reduction in the size of the exposure aperture both takes place uniformly during turning of the driving ring 28 of the automatic means, the parts in their rest position shown in FIG. 3 providing the largest exposure aperture and the longest exposure time, as was pointed out above.

When both the exposure time and the exposure aperture start to reduce, the camming edge 91 which of course turns with the ring 28 engages the element 48 so as to shift the lever 43 and the rod 50 in opposition to the spring 49, and in this way the moving means is actuated by the automatic means so as to move the combined scanning and indicating means 68 to positions which are indicative of the combination of exposure time and exposure aperture set automatically into the camera through the automatic means. The manner in which the moving means turns the combined scanning and indicating means 68 has been described above. Thus, the pinion 61 at this time will cooperate with the rack 62 to move the motion transmitting element 63 in a direction opposite to that indicated by the arrow $b$ in FIG. 4, and thus the bifurcated portion 66 of the element 63 will move the pin 67 along the slot 70 and will turn the combined scanning and indicating means in the direction of the arrow $f$ as shown in FIG. 4, so that the scanning portion 68a approaches the rod member 78. The movement of the parts will terminate when the scanning portion 68a engages the rod member 78, and since this rod member 78 has a position determined by the lighting conditions, it is apparent that the exposure time and exposure aperture will be automatically set in accordance with the lighting conditions. Thus, when the scanning portion 68a is stopped by the stop means which is formed by the rod member 78, the camming edge 38 will no longer move so as to change the position of the pin 14 and the pin 90 will no longer move so as to change the position of the ring 21, and thus the settings of the exposure time and exposure aperture are automatically determined.

The camera may be provided adjacent to the hand of the operator which engages the element 36 with a release plunger which is actuated by the operator to trip the shutter and make the exposure, and then the operator simply releases the element 36 so that the return spring 35 can return the release member 32 to its rest position shown in FIG. 3. Of course, during this time the upper part 31 of the release member 32 will engage the arm 29 of the drive member 28 so as to turn this drive member 28 in a direction opposite to that indicated by the arrow d back to its starting position shown in FIG. 3, and during this movement the spring 30 is tensioned. Also, the spring 22 returns the ring 21 and therefore the diaphragm to its starting position of largest aperture, and at the same time an unillustrated spring of the time-controlling structure returns the pin 14 and the sector 15 to their starting position, this return being permitted by the return of the camming edge 38 to its starting position. Near the end of the return movement of the driving ring 28, pin 89 engages the projection 88 of the shifting member 84 of the positioning means and moves this shifting member 84 in opposition to the spring 87 to the position shown in FIG. 4 where the meter means 75 has again been positioned with the stop or rod member 78 located beyond the combined scanning and indicating means 68. With the return of the meter means 75 to the position for manual operation the rod member 78 no longer engages the ear 72 or the wall 79 so that the pointer 76 is now free to move to the positions called for by changes in light intensity. Also, with the return of ring 28 to its starting position the camming edge 91 moves so as to permit the spring 49 to shift the rod 50 and the lever 43 to the left, as viewed in FIG. 2, in the direction opposite to that indicated by the arrow e, and the spring 92 can now turn the lever 53 so as to maintain the projection 51 of the lever 53 in engagement with the end of the rod 50 as this latter rod 50 moves back to its starting position. This return movement of the lever 53 acts through the compensating slot 54 on the pin 55 of the lever 57 to turn this lever back to its starting position, and of course the gears 58 and 59 cooperate with the rod 60 so as to turn this rod 60 together with the pinion 61 in a direction which shifts the motion-transmitting element 63 through the rack 62 also back to its starting position. Thus, the bifurcated portion 66 of element 63 will cooperate with the pin 67 to turn the combined scanning and indicating means 68 back to its starting position indicated in FIG. 4.

In the event it is desired to operate the camera manually, the rings 6 and 7 are turned so as to provide the desired combination of exposure time and exposure aperture. This manual turning of the ring 6 causes the ring 11 to turn through its connection by way of projection 10 with the ring 6, as described above, and initially the portion 12a of the camming edge 12 will cooperate with the pin 14. This portion 12a has a center of curvature located in the optical axis so that during the initial turning of the ring 11 the exposure time remains unchanged at its longest period of $\frac{1}{30}$ second in the illustrated example. The angle through which the portion 12a of the camming edge extends is equal to the angle through which the ring 6 is turned in order to locate the symbol or graduation 30 in alignment with the index 9 after the symbol A has been located in alignment with the index 9. During this turning of the exposure time setting ring 11 the portion 13a of the slot 13 moves with respect to the pin 16. As long as the symbols indicating automatic or flash operation are aligned with the index 9, the pin 16 is still in the portion 13a of the slot 13. However, when the symbol B is aligned with the index 9, the portion 13c of the slot 13 is aligned with the pin 16, and the pin 16 is now capable of moving into the wider portion 13c of the slot 13 so that lever 17 can turn to render the shutter manually operable in a well known manner according to which the operator can manually maintain the shutter in its open position. When the operator releases the shutter the pin 16 becomes aligned with the portion 13b as well as the portion 13a of the slot 13, which is to say the pin 16 moves next to the outer edge of the slot 13, and now the operator can turn the ring 6 in either direction. Thus, the operator can turn the ring 6 in a counterclockwise direction, as viewed in FIG. 3, in order to set the camera manually to provide a desired exposure time. At this time the pin 16 will of course be located in the portion 13b of the slot 13. Thus, with the portion 13b of the slot 13 aligned with the pin 16 the shutter will provide an exposure time determined by the setting of the ring 6, when the shutter is released by the operator, and once the portion 13b is aligned with the pin 16 the tripping of the shutter will provide the exposure time for which the ring 6 is set due to the engagement of the camming portion 12b with the pin 14. In other words, whenever the slot portion 13b is aligned with the pin 16 the camming edge portion 12b engages the pin 14 so that the exposure time is adjusted through the ring 11 at this time.

Manual turning of the ring 7 in the direction of the arrow g will cause the projection 19 to turn the projection 20 and the diaphragm-setting ring 21 in opposition to the spring 22 so as to set the diaphragm in the manner described above. It will be noted that in this way the ring 21 is operated in the same way as it was operated by the automatic means, and the continued turning of the ring 7 in the direction of the arrow g will provide progressively smaller exposure apertures in the illustrated example. A suitable releasable detent structure cooperates with the ring 7 to maintain it in whichever angular position it is set by the operator in opposition to the spring 22, so that the spring 22 is incapable of moving the ring 7 from its adjusted position, and the selected setting of the diaphragm will be maintained.

The turning of the rings 6 and 7 of course result in turning of the camming edges or cams 39 and 40, and during the initial turning of the ring 6 a portion 39a of the camming edge 39 cooperates with the pin 41 of the lever 43. The angular length of the portion 39a of the cam 39 equals the angular distance between the symbol A and the exposure time setting for $\frac{1}{30}$ second of the scale 8, so that until the ring 6 is moved beyond the position required to provide an exposure time of $\frac{1}{30}$ second, there is no movement of the pin 41 since the portion 39a of the cam 39 extends along a circle located in a plane which is normal to the optical axis. Thus, the portion 39a of the cam 39 is an inactive portion which will not turn the lever 43. However, when the ring 6 is turned beyond the position providing an exposure time of $\frac{1}{30}$ second, the portion 39b of the cam 39 will cooperate with the pin 41 so as to turn the lever 43. This will of course result in axial shifting of the rod 50. In the same way, turning of the ring 7 to adjust the diaphragm will cause the camming edge 40 to act on the pin 42 so as to move the lever 43 and also result in shifting of the rod 50. Thus, the lever 43 acts as a differential assuming positions representing the combined exposure time and exposure aperture set into the camera, and in this way the rod 50 will also be shifted accordingly to positions reflecting the combination of exposure time and exposure aperture set into the camera, and thus the entire above-described moving means will be actuated during manual operation of the camera to turn the combined scanning and indicating means 68 to positions indicative of the combination of exposure aperture set into the camera. Inasmuch as the indicating portion 69 of the combined scanning and indicating means 68 is at this time visible to the operator since it is uncovered by the cover member 80, the operator need only look through the window at the upper part of the compartment 2 in order to see both the indicating portion 69 and the tip of the pointer 76, and the operator need only adjust the rings 7 and 8 so as to provide a combination of exposure time and exposure aperture at which the indicating portion 69 will be aligned with the tip of the pointer 76, and the operator will know that the camera has been properly set for making a proper exposure. Of course, at this time the driving ring 28 of the automatic means remains in the position indicated in FIG. 3, so that the position means does not operate and the meter means 75 remains in the position shown in FIG. 4. The tip of the pointer 76 is at a slightly greater distance from the shaft 74 than the indicating portion 69, so that this indicating portion 69 can move beneath the tip of the pointer 76 and the operator can easily see through the window when the indicating portion is aligned with the pointer of the light meter.

Before again operating the camera automatically, the rings 6 and 7 are manually returned to their starting positions shown in FIG. 3.

Figure 5:
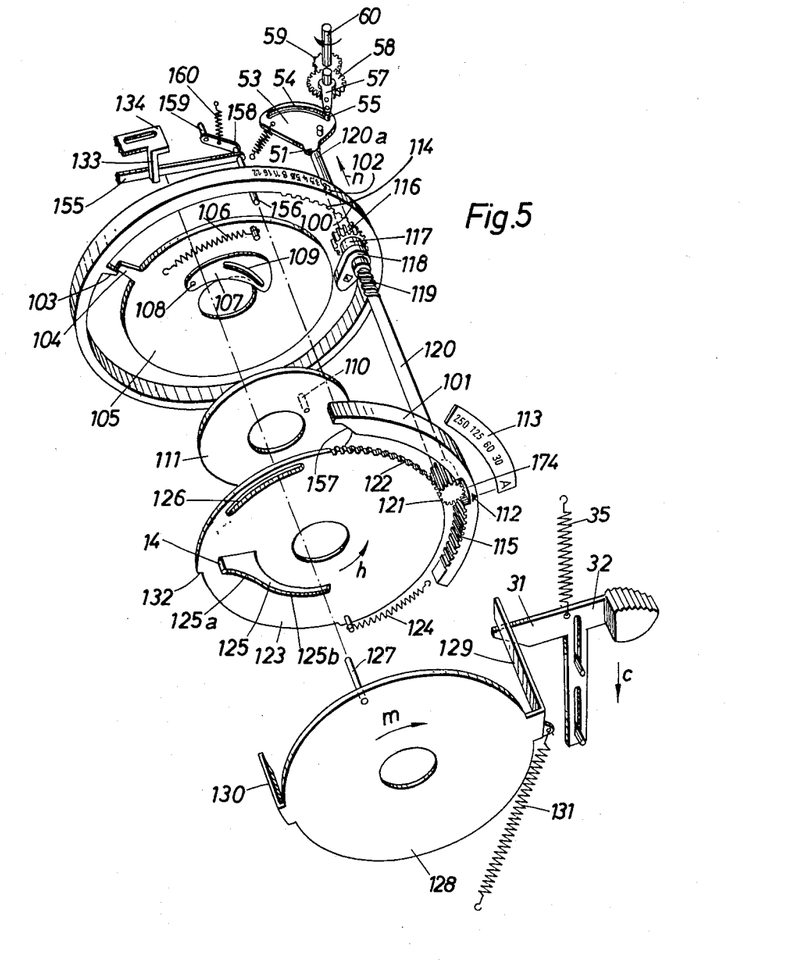
FIG. 5 is an exploded perspective view of another embodiment of an objective assembly according to the present invention.
Figure 6:
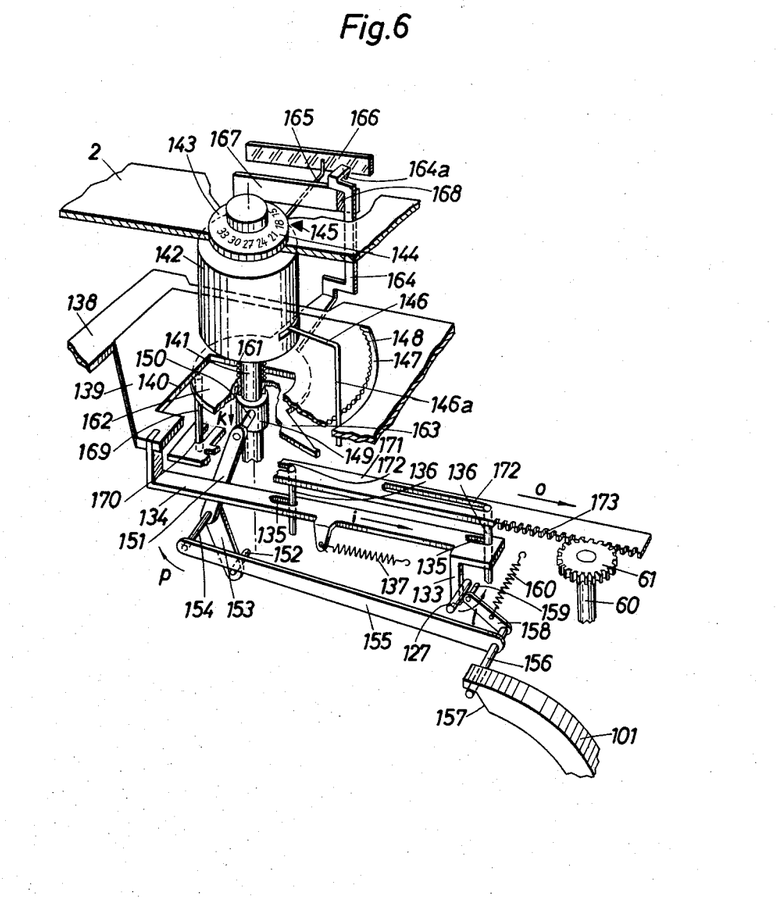
FIG. 6 is a perspective illustration of another embodiment of a meter means and combined scanning and indicating means as well as structure for operating both of these means, the embodiment of the structure which is shown in FIG. 6 cooperating with the embodiment of the structure which is shown in FIG. 5.

In the embodiment of the invention which is illustrated in FIGS. 5 and 6, there are also manually turnable rings for setting the exposure time and the exposure aperture. Thus, the ring 100 shown in FIG. 5 is turnable about the optical axis for setting the exposure aperture, and the ring 101, is manually turnable about the optical axis for setting the exposure time. The ring 100 carries a scale 102 of f-stop numbers, and at its inner periphery this ring fixedly carries a radial projection 103 which is engaged by a radial projection 104 of a rotary diaphragm adjusting ring 105. A spring 106 is connected at one end to the ring 105 and at its opposite end to a stationary part of the camera so as to urge the ring 105 to turn in a counterclockwise direction, as viewed in FIG. 5, and in this way the projection 104 remains in engagement with the projection 103 in the position of the parts shown in FIG. 5. This ring 105 carries a plurality of pins 108 which respectively serve to pivotally support the plurality of diaphragm blades 107, and each of the blades 107 is formed with an arcuate slot 109 receiving a stationary pin 110 fixedly carried by a stationary ring 111. Thus, when the ring 105 turns with respect to the ring 111 the slots 109 move with respect to the pins 110, respectively, so that in this way the several blades 107 are respectively turned about their pivots 108, in order to change the size of the exposure aperture. For the sake of clarity, only one diaphragm blade 107 and the structure cooperating therewith is shown in the drawing. The exposure time setting ring 101 carries an index 112 which cooperates with the scale 113 of exposure times, this scale 113 also carrying a symbol A indicating the setting of the ring 101 for automatic operation of the camera.

The ring 100 is provided along part of its inner periphery with teeth 114, while the ring 101 is provided along part of its inner periphery with teeth 115. A pinion 116 meshes with the teeth 114, and this pinion 116 is fixed to and forms part of a sleeve 117 which is provided with threads at its inner surface and which is supported by a stationary bracket 118 for free rotary movemnet. The bracket 118, which is carried by the stationary part of the camera, prevents axial movement of the sleeve 117 and the gear or pinion 116 while permitting free rotary movement of the sleeve 117 together with the pinion 116. The inner threads of the sleeve 117 threadedly engage the threaded portion 19 at the exterior of an elongated differential rod 120 which is fixed to a pinion 121 located adjacent the teeth 115 in alignment therewith, in the position of the parts shown in FIG. 5. This pinion 121 is in mesh with a toothed portion 122 of the periphery of the exposure time setting ring 123 which is turnable about the optical axis for setting the exposure time. When the ring 101 is turned in a counterclockwise direction, as viewed in FIG. 5, the teeth 115 will mesh with the pinion 121 through which turning of the ring 101 is transmitted to the exposure time setting ring 123, and of course at the same time the differential rod 120 will be turned due to its fixed connection with the pinion 121. The ring 101 is formed at its inner periphery with a notch 174 located at the end of the teeth 115 and receiving the pinion 121 in the position of the parts shown in FIG. 5, where the index 112 is aligned with the symbol A of the scale 13, and thus in this position of the parts the pinion 121 will be capable of turning freely with respect to the ring 101 while this latter ring remains in the position indicated in FIG. 5. Thus, at this time the pinion 121 will be turned only by turning of the ring 123. The end 120a of the spindle 120 which is located distant from the pinion 121 engages the projection 51 of the lever 53 which is formed with the compensating slot 54 as described above. This slot cooperates in the manner described above with the pin 55 which is carried by the lever 57 which is fixed to the gear 58 which meshes with the gear 59 carried by the rod 60, so that shifting of the rod 120 along its axis will result in turning of the lever 53 so as to cause the moving means of this embodiment to turn the rod 60.

A spring 124 is connected at one end to a stationary part of the camera and at its opposite end to the exposure time setting ring 123 and urges this ring to turn in the direction of the arrow h shown in FIG. 5 until the end of the teeth 122 reach the pinion 121, and this is the position in which the parts are shown in FIG. 5. The ring 123 is formed with a cutout the edge 125 of which forms a camming edge cooperating with the pin 14 to control the exposure time in the manner described above. The camming edge 125 has a pair of portions 125a and 125b, and while the portion 125a engages the pin 14 the exposure time will be adjusted, while when the portion 125b engages the pin 14 the exposure time will remain at its smallest value, this portion 125b extending along a circle whose center is in the optical axis. The exposure time setting ring 123 is also formed with an arcuate slot 126 which receives a pin 127 which is fixedly carried by the rotary driving member 128 of this embodiment of the invention. This rotary driving member 128 of the automatic means of the embodiment of FIGS. 5 and 6 fixedly carries a pair of extensions 129 and 130 which extend parallel to the optical axis. The extension or arm 129 is urged by the spring 131 into engagement with the upper portion 31 of the manually operable release means 32 having a structure identical with that described above, and of course the spring 131 urges the driving member 128 to turn in the direction of the arrow m shown in FIG. 5. A return spring 35 cooperates with the release member 32 to urge it to its rest position shown in FIG. 5, as was described above. The arm 130 of the driving member 128 is, in the rest position of the parts shown in FIG. 5, located adjacent but is slightly displaced from a shoulder 132 formed at the outer periphery of the exposure time setting ring 123. After the ring 128 has turned to a relatively short distance in the direction of the arrow m this arm 130 will engage the shoulder 132 so as to turn the exposure time setting ring 123 in opposition to the spring 124. The arm 130 extends through the plane which is occupied by the diaphragm setting ring 105, and after this arm 130 has turned together with the ring 128 through a certain angle, the arm 130 will engage the projection 104 so as to turn the ring 105 in opposition to the ring 106 and thus set the exposure aperture. In this rest position of the parts shown in FIG. 5, the angular displacement of the projection 104 with respect to the shoulder 132 equals the angle about the optical axis through which the camming portion 125a of the camming edge 125 extends, so that in this way the exposure time will have been adjusted throughout its entire range of adjustment before the arm 130 engages the projection 104 to start to reduce the size of the exposure aperture.

As is indicated in FIG. 6, in the rest position of the parts, a projection 133 of a shifting member 134 engages the pin 127 which is fixed to the driving member 128 of the automatic means. The shifting member 134 is formed with elongated slots 135 receiving stationary pins 136 so that in this way the shifting member 134 is guided for movement along a straight line, and a spring 137 is connected at one end to a stationary part of the camera and at its opposite end to the shifting member 134 for urging this member in the direction of the arrow i indicated in FIG. 6. In the illustrated position of the parts, the spring 35 is stronger than the total forces of the springs 131 and 137 so that the spring 35 is capable of not only maintaining the ring 128 in the illustrated position but is also capable of acting through the ring 128 and the pin 127 on the shifting member 134 for maintaining it in the illustrated position in opposition to the spring 137. The end of the shifting member 134 which is distant from the pin 127 is fixedly connected with a shiftable plate 139 which is guided for movement in an opening formed in a stationary plate 138 which is fixedly carried by the camera in its upper compartment 2. The shiftable plate 139 is formed with a cutout 140 through which extends a shaft 141 which is carried by suitable stationary bearings of the camera. This shaft 141 carries the meter means 142 of this embodiment of the invention, and in addition at its upper end the shaft 141 carries a knob 143 which is accessible at the upper exterior portion of the camera. The meter means 142 is of course electrically connected with an unillustrated photosensitive element which responds to the lighting conditions so as to actuate the meter 142. The adjusting knob 143 carries a scale 144 of film speeds, and the graduations of this scale are capable of being selectively aligned with a stationary index 145 carried at the upper surface of the upper compartment 2 of the camera. Thus, the operator can turn, through manipulation of the knob 143, the meter means 142 to an angular position which will introduce into the camera the factor of the speed of the film which is used in the camera, and the knob 143 and the meter 142 may be fixed to the shaft 141 which is thus turned only when the operator sets the film speed with the knob 143. The pointer means of the meter means 142, which is moved by the meter means to positions indicative of the lighting conditions, includes a portion 146 which extends through a suitable slot in the meter housing and which has a downwardly directed free end portion 146a. In the illustrated position of the parts, the portion 146a of the pointer 146 can move freely along a slot 147 formed by the right edge of the opening of the plate 138 which receives the plate 139 and by the toothed edge 148 of the plate 139, this toothed edge as well as the edge of the plate 138 which defines the slot 147 with the toothed edge both having concentric curvatures whose common center is in the axis of the shaft 141 so that the pointer 146 can move freely along the slot 147 in response to changes in the lighting conditions.

The shaft 141 forms a support means for the meter means 142 and the shaft 141 also forms a support means for a sleeve 149 which is axially shiftable along the shaft 141. This sleeve 149 fixedly carries a pin 150 which is pivotally connected with the upper end of a lever 151. This lever 151 is in turn pivotally connected to the pin 154 to which a lever 153 is also pivotally connected, this lever 153 being supported for turning movement by a stationary pin 152 which is carried by a stationary part of the camera. Thus, the levers 151 and 153 form a toggle linkage, and an elongated actuating bar 155 is fixed to the pin 154 to which both of the levers 151 and 153 are pivotally connected. The toggle linkage means which includes the levers 151, 153 and the bar 155 is capable of being actuated to axially shift the sleeve 149. The bar 155 fixedly carries a control pin 156 which extends into the plane occupied by the exposure time setting ring 101, and this pin 156 cooperates with an inclined inner surface portion 157 of the ring 101. The cooperation of the portion 157 of the ring 101 with the pin 156 controls, through the toggle linkage means, the position of the sleeve 149. The control pin 156 is pivotally connected with a lever 158 which is supported for turning movement by a stationary pin 159 of the camera, and a spring 160 is connected at one end to a stationary part of the camera and at its opposite end to the lever 158 to urge this lever 158 to turn in the direction of the arrow *l*, so that in this way the pin 156 is urged toward the inner periphery of the ring 101.

The end of the sleeve 149 which is directed toward the meter 142 serves as a support for a combined scanning and indicating means 162 which is engaged by a spring 161 coiled about the shaft 141 and also engaging the bottom end of the lever 142, so that in this way the spring 161 acts to maintain the combined scanning and indicating means 162 in engagement with the upper end of the sleeve 149. At the same time, this combined scanning and indicating means 162 is freely turnable about the shaft 141. The combined scanning and indicating means 162 has a scanning portion 163 in the form of an arm which is located in a plane through which the free end portion 146a of the pointer 146 passes during automatic operation of the camera, so that the combined scanning and indicating means 162 is capable of being turned by the automatic means in a manner described below until the scanning portion 163 engages the pointer portion 146a. In the position of the parts shown in FIG. 6 the combined scanning and indicating means 162 is located at an elevation where the scanning portion 163 will engage the pointer 146 upon turning of the combined scanning and indicating means 162 in a counterclockwise direction, as viewed in FIG. 6. The combined scanning and indicating means 162 includes an indicating portion 164 which extends upwardly in the manner shown in FIG. 6. The rotor of the meter 142 fixedly carries in addition to the pointer portion 146 a pointer portion 165 which forms a pointer means together with the pointer portion 146, and the indicating portion 164 of the combined scanning and indicating means 162 is adapted to cooperate with the pointer portion 165. For this purpose the indicating portion 164 terminates in a pointed free end portion 164a. The pointer portion 165 of the meter is at all times visible through a window 166 located at the rear of the compartment 2. On the other hand, the indicating portion 164, except at its tip 164a, is located behind a plate 167 which is parallel to the window 166. In the rest position of the parts, this plate 167 has an opaque portion 168 behind which the indicating portion 164 is located so as to be invisible at this time. The upper end of the indicating portion 164 extends around the upper edge of the plate 167 and thus the tip 164a of the indicating portion 164 can be seen through the window 166. Thus, during manual operation of the camera, in a manner described below, the operator will set the exposure time and exposure aperture until the tip 164a of the indicating portion is aligned with the pointer 165, and the operator will know that the camera has been properly set. However, during automatic operation of the camera, when the parts have the position shown in FIGS. 5 and 6, the toggle linkage means maintains the structure at an elevation where the tip 164a is located above the window 166 and is this way rendered invisible. Thus, it is only when the combined scanning and indicating means 162 has been shifted along the support means 141 to its lower manual operation position that the tip 164a of the indicating portion 164 becomes visible through the window 166.

A moving means is provided in this embodiment also for moving the combined scanning and indicating means to positions indicative of the combined settings of the exposure time and exposure aperture of the camera, and this moving means includes a pin 169 which is fixed to the combined scanning and indicating means 162 and which is received in a bifurcated portion 170 of the elongated shifting member 171 which forms part of the moving means including the train of elements formed by the rod 60 and the gears connected thereto as well as the differential spindle 120 and the structure for moving the same, and of course the lever 53 as described above. The motion transmitting element 171 of the moving means, which is provided with the bifurcated portion 170 receiving the pin 169, has a rack portion 173 meshing with the pinion 61 fixed to the upper end of the rod 60. The motion transmitting element 171 is formed with elongated slots 172 also receiving the stationary pins 136, so that in this way the motion transmitting element 171 is also guided for straight line movement in a direction perpendicular to the axis of the shaft 141.

Assuming that the parts are in the position shown in FIGS. 5 and 6, where the rings 100 and 101 have been set for automatic operation of the camera, then in order to operate the camera automatically the operator need only press the release means 32 so as to release the ring 128 to the spring 130. Thus, the spring 131 will now turn the ring 128 in the direction of the arrow $m$, and during the initial part of the turning of the ring 128 the pin 127 will advance to the right, as viewed in FIG. 6, so that the spring 137 will now be capable of shifting the shifting member 134 in the direction of the arrow $i$, and in this way the clamping plate 139 will also be shifted to the right so that its toothed edge 148 will engage the pointer portion 146a and clamp it between the toothed edge 148 and the curved edge of the cutout of the plate 138 which receives the clamping plate 139, and in this way the pointer 146 will be restrained against any further movement and transmission of undesirable shocks from the combined scanning and indicating means to the meter also will be avoided in this way.

At the instant when the pointer of the meter means 142 has been clamped against movement in this way, the arm 130 engages the shoulder 132 and now the continued turning of the ring 128 turns the exposure time setting ring 123 in a clockwise direction, as viewed in FIG. 5, so that the camming edge 125a cooperates with the pin 14 to gradually reduce the exposure time during the continued turning of rings 123 and 128. Also, at this time the toothed peripheral portion 122 of the exposure time setting ring 123 cooperates with the pinion 121 so as to turn the spindle or differential rod 120. Inasmuch as the sleeve 117 is restrained against axial movement, the result is that the spindle 120 will shift axially in the direction of the arrow $n$ shown in FIG. 5, and the length of the pinion 121 is such that throughout the longest possible shifting of the spindle 120 the pinion 121 will always remain in engagement with the teeth 122 and will be capable of being engaged with the teeth 115. Thus, the threads 119 will cooperate with the inner threads of the sleeve 117 to axially move the rod 120 during rotation thereof by the teeth 122 and the pinion 121, and thus the moving means will be actuated to shift the motion transmitting element 171 in the direction of the arrow $o$, and thus the pin 169 together with the combined scanning and indicating means 162 will be turned into a direction which causes the scanning portion 163 to approach the pointer portion 146a which at this time is located in the path of turning of the scanning portion 163. Thus, the combined scanning and indicating means will be capable of turning until its scanning portion 163 engages the portion 146a of the pointer 146, and at this time the automatic structure will stop operating. When the light intensity is of a relatively low or of an intermediate value, it may be that the scanning portion 163 will engage the pointer 146 before the arm 130 has reached the projection 104, so that the automatic structure will only have reduced the exposure time and the exposure aperture will remain at its largest value. However, under conditions of relatively high light intensity, when the exposure time has been reduced to its smallest value, the arm 130 will engage the projection 104 so that during the continued turning of the ring 128, while the scanning portion 163 continues to approach the pointer 146, the exposure aperture will be reduced, and of course at this time the circular portion 125b of the edge 125 engages the pin 14 so that the exposure time remains unchanged at its shortest value. The angular distance through which the toothed portion 122 of the periphery of the ring 123 extends is at least as great as the entire angle through which the ring 128 turns in order to reduce not only the exposure time to its smallest value but also the exposure aperture to its smallest size, so that during the turning of the ring 105 by the arm 130 in order to reduce the size of the exposure aperture, the ring 123 continues to turn and the teeth 122 continue to cooperate with the pinion 121 for actuating the differential rod 120, and in this way the ring 123 serves to introduce into the moving means the factor of the size of the diaphragm as well as the size of the exposure time. The arcuate slot 126 of the plate 123 trough which the pin 127 extends is only required to be long enough to provide for turning movement of the pin 127 with the ring 128 during initial turning of the ring 128 until the arm 130 engages the shoulder 132, so that the slot 126 does not in any way interfere with the operations.

Thus, when the scanning portion 163 engages the pointer 146 the parts will have been automatically set in a combination of exposure time and exposure aperture which will provide a proper exposure, and the operator can trip the shutter so as to make the exposure, and then the release means 32 is released so that the return spring 35 returns the release means to its starting position. Of course, the upper portion 31 of the release means 32 engages the arm 129 so as to turn the ring 128 in opposition to the spring 131 back to its starting position, and of course the arm 130 will return to its starting position so that the springs 106 and 124 can return the diaphragm ring 105 and the exposure time ring 123, respectively, back to their starting positions. Of course, the toothed portion 122 of the periphery of the ring 123 will now cooperate with the pinion 121 so as to turn it in the opposite direction, and thus the axial movement of the rod 120 will be the reverse of that indicated by the arrow $n$ in FIG. 5, so that now the spring 92 which is connected to the lever 53 can return this lever to its starting position and in this way the moving means will be actuated to return the combined scanning and indicating means 162 to its starting position. Just before the ring 128 reaches the end of its return movement the pin 127 engages the projection 133 and shifts the shifting member 134 in opposition to the spring 137 to the position shown in FIG. 6 where the toothed edge 148 of the plate 139 is again spaced from the curved edge of the opening of the plate 139 to provide the slot 147 with a greater width permitting at this time free movement of the pointer 146, and of course of the pointer 165 together with the pointer 146.

In the event that it is desired to manually operate the camera of the embodiment of FIGS. 5 and 6, then the operator will first turn the manually turnable ring 101 so as to set the exposure time manually, and this will of course result in moving of the index 112 to a selected value of exposure time carried by the scale 113. During the initial part of the turning of the ring 101, before the index 112 reaches the first graduation of the scale 113, the inclined inner surface portion 157 of the ring 101 cooperates with the pin 156 to shift the bar 155 of the toggle linkage means so as to turn the pin 154 in the direction of the arrow $p$ shown in FIG. 6, and the levers 151 and 153 now cooperate to move the sleeve 149 downwardly in the direction of the arrow $k$ as shown in FIG. 6. It will be noted that since the lever 153 is turnable about the stationary pivot pin 152, the upper end of the lever 153 can only move downwardly at this time. The spring 161 causes the combined scanning and indicating means 162 to follow the downward movement of the sleeve 149 at this time, and as a result the entire combined scanning and indicating means 162 is moved along the support means 141 away from the meter 142 to a location where the plane in which the scanning portion 163 is located is spaced below the bottom end of the pointer portion 146a, so that at this time it is impossible for the scanning portion 163 to engage the pointer portion 146a. At the same time, this downward movement has moved the tip 164a of the indicating portion 164 into a position where it is visible through the window 166. Thus, the operator can at this time see through the window 166 the relative positions of the pointers 165 and 164a.

The turning of the ring 101 places the teeth 115 in mesh with the pinion 121 so that this pinion turns and thus the rod 120 shifts axially to act with end 120a on the lever 153 for actuating the moving means to position the combined scanning and indicating means according to the settings of the exposure time and exposure aperture set into the camera. The turning of the ring 100 will cause the projection 103 to turn the projection 104 and thus the ring 105 so as to provide a diaphragm setting selected by the operator. At this time the teeth 114 of the ring 100 will turn the pinion 116 and thus the sleeve 117 so as to cause the threads 119 to shift the rod 120 according to the position of the diaphragm, and in this way the differential spindle 120 serves to actuate through the moving means the combined scanning and indicating means according to the combination of exposure time and exposure aperture set into the camera. Even when the ring 101 is stationary, assuming that the exposure time has been set and the aperture is now adjusted, the cooperation of the rotary pinion 116 and sleeve 117 with the spindle 120 will shift this spindle. Thus, the operator sets the rings 100 and 101 to provide a combination of exposure time and exposure aperture which aligns the indicating portion 164a with the pointer 165, and the operator knows that the camera has been set to provide a proper exposure in accordance with the lighting conditions.

After the shutter has been tripped to make the exposure, if it is desired to return the parts to the position required for automatic operation of the camera, then the ring 100 is turned to provide the setting at which the largest exposure aperture is provided, and the exposure time setting ring 101 is turned until the index 112 is aligned with the symbol A of the scale 113. Thus, in this way the springs 106 and 124 return the rings 105 and 123, respectively, to their starting positions, and an exposure may be made in a fully automatic manner as described above.

It will be understood that each of the elements described above, or two or more together, may also find a useful application in other types of cameras differing from the types described above.

While the invention has been illustrated and described as embodied in cameras adapted to be operated either manually or automatically, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera which is capable of being operated either manually or automatically, in combination, support means; combined scanning and indicating means movably supported by said support means; moving means cooperating with said combined scanning and indicating means for moving the latter to a position indicative of the settings of the exposure aperture and exposure time of the camera irrespective of whether the camera is operated manually or automatically; meter means responding to the lighting conditions and also carried by said support means; pointer means moved by said meter means to positions indicative of the lighting conditions, said combined scanning and indicating means having an indicating portion cooperating with a portion of said pointer means to indicate to the operator when the exposure time and exposure aperture of the camera have been properly set during manual operation of the camera; and positioning means positioning said combined scanning and indicating means and said pointer means one with respect to the other in a position where a scanning portion of said combined scanning and indicating means cooperates with said pointer means to determine automatically the position of said combined scanning and indicating means during automatic operation of the camera and in a position where said combined scanning and indicating means and said pointer means do not cooperate with each other during manual operation of the camera.

2. In a camera which is capable of being operated either manually or automatically, in combination, support means; combined scanning and indicating means movably carried by said support means; moving means cooperating with said combined scanning and indicating means for moving the latter; manually operable means for setting the exposure time and exposure aperture of the camera, said manually operable means actuating said moving means to move said combined scanning and indicating means to positions indicative of the settings of the exposure time and exposure aperture of the camera; automatic means for automatically setting the exposure time and exposure aperture of the camera, said automatic means also actuating said moving means to move said combined scanning and indicating means to positions indicative of the settings of the exposure time and exposure aperture of the camera; meter means carried by said support means, said meter means being adapted to be actuated by a photosensitive element responding to the lighting conditions; pointer means actuated by said meter means to be moved thereby to positions indicative of the lighting conditions, said pointer means and combined scanning and indicating means being located adjacent each other and said combined scanning and indicating means having an indicating portion cooperating with a portion of said pointer means for indicating to the operator proper manual setting of the camera during actuation by the operator of said manually operable means for setting the exposure time and exposure aperture of the camera; and positioning means actuated by said automatic means and cooperating with said combined scanning and indicating means and said meter means for positioning them one with respect to the other in a position where a scanning portion of said combined scanning and indicating means cooperates with said pointer means to determine the extent to which said automatic means adjusts the exposure time and exposure aperture of the camera during operation of said automatic means and in the position where said scanning portion of said scanning means and said pointer means are incapable of cooperating with each other when said automatic means is in a non-operative rest position, so that in the latter position of said automatic means the position of said combined scanning and indicating means will be determined solely by said manually operable means.

3. In a camera which is adapted to be operated either manually or automatically, in combination, a pair of means, one of said means being a scanning means and the other of said means being a meter means adapted to be actuated by a photosensitive element which responds to the lighting conditions, said meter means including a pointer which is moved by said meter means to a position which is indicative of the lighting conditions; support means supporting one of said pair of means for movement toward and away from the other of said pair of means; automatic means for automatically setting the exposure time and exposure aperture of the camera, said automatic means having a predetermined rest position; and positioning means actuated by said automatic means and positioning said one of said pair of means with respect to the other of said pair of means in a position where said scanning means is located beyond the range of turning of said pointer when said automatic means is in said rest position thereof, so that said scanning means and pointer cannot cooperate with each other when said automatic means is in its rest position, and positioning said one of said pair of means with respect to the other of said pair of means in a position where said scanning means is located in the path of movement of the pointer, during operation of said automatic means when the latter is displaced from said rest position thereof, so that during operation of said automatic means said scanning means is capable of cooperating with said pointer for controlling the setting of the exposure time and exposure aperture of the camera by said automatic means.

4. In a camera which is adapted to be operated automatically or manually, in combination, scanning means; meter means adapted to be actuated by a photosensitive element which senses the lighting conditions; a pointer moved by said meter means to positions indicative of the lighting conditions; support means supporting said meter means for movement toward and away from said scanning means; automatic means of automatically setting the camera, said automatic means including a manually releasable drive member which drives the automatic means when said drive member is manually released; a positioning means actuated by said drive member when the latter is released, and said positioning means having a pin-and-slot connection with said meter means for moving the latter to a position where the path of movement of the pointer intersects said scanning means upon release of said drive member.

5. In a camera which is adapted to be operated either automatically or manually, in combination, scanning means; meter means adapted to be actuated by a photosensitive element which responds to the lighting conditions, said meter means including a pointer which moves to positions indicative of the lighting conditions; a shifting member; pin-and-slot means connecting said shifting member to said meter; spring means acting on said shifting member for urging the latter to move from a rest position in a direction which transmits through said pin-and-slot means, movement to said meter means moving said pointer thereof to a position where the path of movement of the pointer intersects said scanning means; and automatic means for automatically setting the camera, said automatic means having a rest position locating said shifting member in said rest position thereof in opposition to said spring means and said shifting member when in said rest position locating said meter at a position where the path of movement of said pointer does not intersect said scanning means.

6. In a camera as recited in claim 1, said positioning means including a toggle-linkage means cooperating with said combined scanning and indicating means for moving the same between said positions thereof and said positioning means also including a manually operable means for participating in the manual setting of the camera, said manually operable means having a predetermined position when the camera is set for automatic operation, said manual operable means when in said predetermined position thereof actuating said toggle-linkage means to locate said combined scanning and indicating means in said position thereof during automatic operation of the camera and said manually operable means when moved away from said predetermined position thereof for participating in the manual setting of the camera actuating said toggle-linkage means to locate said combined scanning and indicating means in said position thereof where it does not cooperate with said pointer means.

7. In a camera which is adapted to be operated either automatically or manually, in combination, a pair of means one of which is a combined scanning and indicating means and the other of which is a meter means which is actuated by a photosensitive element which responds to the lighting conditions and which includes a pointer which moves to positions indicative of the lighting conditions; support means supporting one of said pair of means for movement toward and away from the other of said pair of means; positioning means cooperating with that one of said pair of means which is supported for movement by said support means for moving said one means to a position where said pointer and combined scanning and indicating means are capable of cooperating with each other when the camera is to be operated automatically and to a position where said combined scanning indicating means and said pointer are incapable of cooperating with each other when the camera is to be operated manually, said combined scanning and indicating means including an indicating portion whose position with respect to the pointer is used to determine the proper setting of the camera during manual operation thereof; and means cooperating with said indicating portion of said combined scanning and indicating means for rendering said indicating portion invisible to the operator when said positioning means positions said one of said pair of means with respect to the other of said pair of means in the position where said combined scanning and indicating means cooperates with said pointer during automatic operation of the camera.

8. In a camera which is adapted to be operated either automatically or manually, in combination, combined scanning and indicating means; meter means adapted to be actuated by a photosensitive element which responds to the lighting conditions and including a pointer which is moved by said meter means to positions indicative of the lighting conditions; support means supporting said meter means for movement toward and away from said combined scanning and indicating means; positioning means cooperating with said meter means for moving the same toward said combined scanning and indicating means to a position where the latter means cooperates with said pointer during automatic operation of the camera and to a position where said pointer is located beyond said combined scanning and indicating means during manual operation of the camera, said combined scanning and indicating means having an indicating portion which cooperates with said pointer during manual operation of the camera to indicate proper setting of the camera; and a cover member carried by said meter means for movement therewith and covering said indicating portion of said combined scanning and indicating means when said meter means is moved by said positioning means to the position where said pointer and combined scanning and indicating means cooperate with each other so that during automatic operation of the camera said cover member renders said indicating portion of said combined scanning and indicating means invisible.

9. In a camera as recited in claim 1, viewing means through which said portion of said pointer means and said indicating portion of said combined scanning and indicating means are visible during manual operation of the camera, said positioning means moving said indicating portion of said combined scanning and indicating means beyond said viewing means to render said indicating portion invisible when said positioning means positions said combined scanning and indicating means in said automatic position thereof.

10. In a camera which is adapted to be operated either manually or automatically, in combination, a pair of manually operable means for manually setting the exposure time and exposure aperture, respectively, of the camera; a pair of cams respectively connected to said pair of manually operable means for movement therewith; automatic means for automatically setting the exposure time and exposure aperture of the camera; a third cam connected to said automatic means for movement therewith; differential lever means actuated by said pair of cams during operation of said pair of manually operable means and actuated by said third cam during operation of said automatic means for assuming positions indicative of the combined exposure time and exposure aperture set into the camera; moving means actuated by said differential means; and combined scanning and indicating means actuated by said moving means, so that said combined scanning and indicating means will assume positions indicative of the combination of exposure time and exposure aperture set into the camera either manually or automatically.

11. In a camera as recited in claim 1, exposure time setting means; exposure aperture setting means; a pair of manually operable means respectively cooperating with said pair of exposure setting means for manually actuating the same; differential means actuated by said pair of manually operable means for movement to positions indicative of the combined settings of said exposure aperture setting means and exposure time setting means; automatic means automatically actuating one of said setting means to actuate said differential means through the latter for moving said differential means also to positions indicating the combined exposure time and exposure aperture settings of the camera during automatic operation thereof, said moving means being actuated by said differential means and cooperating with said combined scanning and indicating means for moving the latter means to said positions indicative of the combination of the settings of the exposure time and exposure aperture of the camera.

12. In a camera as recited in claim 1, a rotary exposure time setting ring having a toothed peripheral portion; a pinion meshing with said toothed peripheral portion; a threaded shaft fixed to said pinion for rotary movement therewith; a sleeve threadedly engaging said shaft; means restraining said sleeve against axial movement but freeing the latter from rotary movement; a second pinion fixed to said sleeve; a manually turnable exposure time setting ring carrying teeth which mesh with said first-mentioned pinion for turning the latter and said shaft therewith and for turning through said first-mentioned pinion said exposure time setting ring to set the exposure time; a manually turnable exposure aperture setting ring having teeth cooperating with said pinion which is fixed to said sleeve to turn the latter pinion and thus turn said shaft, whereby said shaft acts as a differential to assume positions indicating the combined settings of the exposure time and exposure aperture of the camera; and automatic means for automatically setting the camera, said automatic means cooperating with said exposure time setting ring for turning the latter to set the exposure time and to turn said shaft, said automatic means continuing to turn said exposure time setting ring after the exposure time has been moved through its entire range thereby to continue turning said shaft through said first-mentioned pinion so as to indicate during operation of said automatic means by the position of said shaft the combined setting of the exposure time and exposure aperture of the camera, and said moving means being actuated by said shaft and cooperating with said combined scanning and indicating means for moving the latter means to said positions indicative of the combination of the settings of the exposure time and exposure aperture of the camera.

References Cited in the file of this patent

UNITED STATES PATENTS

| | | |
|---|---|---|
| 2,969,004 | Gebele | Jan. 24, 1961 |
| 3,013,478 | Gebele | Dec. 19, 1961 |

FOREIGN PATENTS

| | | |
|---|---|---|
| 829,902 | Great Britain | Mar. 9, 1960 |